(12) United States Patent
Shen et al.

(10) Patent No.: US 10,528,798 B2
(45) Date of Patent: Jan. 7, 2020

(54) BODY INFORMATION ANALYSIS APPARATUS AND EYE SHADOW ANALYSIS METHOD THEREOF

(71) Applicant: CAL-COMP BIG DATA, INC., New Taipei (TW)

(72) Inventors: Shyh-Yong Shen, New Taipei (TW); Min-Chang Chi, New Taipei (TW); Eric Budiman Gosno, ID (ID)

(73) Assignee: CAL-COMP BIG DATA, INC., New Taipei (TW)

( * ) Notice: Subject to any disclaimer, the term of this patent is extended or adjusted under 35 U.S.C. 154(b) by 148 days.

(21) Appl. No.: 15/870,988

(22) Filed: Jan. 14, 2018

(65) Prior Publication Data
US 2019/0065830 A1 Feb. 28, 2019

(30) Foreign Application Priority Data
Aug. 24, 2017 (CN) .......................... 2017 1 0735801

(51) Int. Cl.
*G06K 9/00* (2006.01)
*G06T 7/90* (2017.01)
(Continued)

(52) U.S. Cl.
CPC ..... *G06K 9/00281* (2013.01); *G06K 9/00248* (2013.01); *G06K 9/4652* (2013.01); *G06T 7/11* (2017.01); *G06T 7/90* (2017.01)

(58) Field of Classification Search
CPC .............. G06K 9/00281; G06K 9/4652; G06K 9/00248; G06T 7/11; G06T 7/90
(Continued)

(56) References Cited

U.S. PATENT DOCUMENTS 5,680,481 A * 10/1997 Prasad ............... G06K 9/00281
382/190
2007/0186946 A1* 8/2007 Castleberry ............ A45D 40/24
132/200
(Continued)

FOREIGN PATENT DOCUMENTS

JP 2001216386 A 8/2001
JP 3459350 B2 10/2003
(Continued)

OTHER PUBLICATIONS

Search Report dated Jul. 5, 2018 of the corresponding European patent application.
(Continued)

*Primary Examiner* — Jerome Grant, II
(74) *Attorney, Agent, or Firm* — Chun-Ming Shih; HDLS IPR Services

(57) ABSTRACT

An eye shadow analysis method adopted by a body information analysis apparatus includes following steps: performing positioning actions on each part of a face after the face is recognized by an image recognition module of the apparatus; obtaining positions of at least a left eyebrow, a left eye, a right eyebrow, and a right eye after the positioning actions; determining a position of a left eye shadow according to the left eyebrow and the left eye; determining another position of a right eye shadow according to the right eyebrow and the right eye; analyzing average color values of the two eye shadows; comparing two average color values of the two eye shadows or comparing each average color value respectively with a default color value; displaying a comparison result; and, re-executing above steps before an assisting function is terminated.

12 Claims, 11 Drawing Sheets

(51) Int. Cl.
*G06T 7/11* (2017.01)
*G06K 9/46* (2006.01)

(58) Field of Classification Search
USPC .......................................................... 382/118
See application file for complete search history.

(56) References Cited

U.S. PATENT DOCUMENTS

| | | |
|---|---|---|
| 2012/0044335 A1 | 2/2012 | Goto |
| 2013/0169827 A1* | 7/2013 | Santos ............... H04N 5/23229 |
| | | 348/207.1 |
| 2015/0145882 A1* | 5/2015 | Nguyen ................. H04N 1/622 |
| | | 345/589 |
| 2015/0254501 A1* | 9/2015 | Yamanashi ........ G06K 9/00268 |
| | | 348/78 |
| 2017/0256084 A1* | 9/2017 | Iglehart ............... G06K 9/00221 |
| 2017/0348982 A1* | 12/2017 | Wong .................... A45D 33/02 |

FOREIGN PATENT DOCUMENTS

| | | | | |
|---|---|---|---|---|
| JP | 4760999 | * | 8/2011 | ............. G06T 11/00 |
| JP | 2016129027 A | | 7/2016 | |
| KR | 20130100314 A | | 9/2013 | |
| WO | 2015029372 A1 | | 3/2015 | |

OTHER PUBLICATIONS

Office Action dated May 27, 2019 of the corresponding Koean patent application.
Office Action dated Dec. 18, 2018 of the corresponding Japan patent application.

* cited by examiner

BODY INFORMATION ANALYSIS APPARATUS AND EYE SHADOW ANALYSIS METHOD THEREOF

BACKGROUND OF THE INVENTION

1. Technical Field

The technical field relates to an analysis apparatus and an analysis method, and specifically relates to a body information analysis apparatus and an eye shadow analysis method thereof.

2. Description of Related Art

Applying cosmetics is an important one of multiple routine jobs for women.

Generally, a user usually sits in front of the mirror for applying cosmetics, or uses apparatuses having the camera and the monitor (such as smart phones, tablets, etc.) to substitute the traditional mirror for applying cosmetics.

However, the user can only check and confirm whether the makeup is done evenly or the color is appropriated or not by his/her bare eyes, that's why some users with less experiences may face the problem in slow makeup speed or terrible makeup quality.

According to the problem, users in this technical field seriously need an auxiliary apparatus, which may assist the users to apply cosmetics quickly and also to optimize the quality of the makeup.

SUMMARY OF THE INVENTION

The invention is directed to a body information analysis apparatus and an eye shadow analysis method thereof, which may analyze an image of eye shadows of the user and guide the user when the user is applying cosmetics, so as to assist the user to apply cosmetics more quickly and accurately.

In one of the exemplary embodiments, the eye shadow analysis method includes following steps: performing positioning actions to each facial feature of a face once the face is recognized by an image capturing module of the body information analysis apparatus; obtaining positions of a left eyebrow, a left eye, a right eyebrow, and a right eye respectively; determining a position of a left eye shadow according to the left eyebrow and the left eye, and determining another position of a right eye shadow according to the right eyebrow and the right eye; analyzing average color values of the left eye shadow and the right eye shadow; comparing the average color values with default color values, or comparing one of the average color values of the left eye shadow with another one of the average color values of the right eye shadow; displaying a comparison result through a display module of the body information analysis apparatus; and, re-executing above steps before the auxiliary actions are completed.

In one of the exemplary embodiments, the body information analysis apparatus at least includes an image capturing module, a display module, and a processor, wherein the image capturing module is arranged to capture an external image, the processor is configured to recognize the external image. The processor performs positioning actions to each facial feature of a face once the face is recognized from the external image for obtaining positions of a left eyebrow, a left eye, a right eyebrow, and a right eye. The processor then determines a position of a left eye shadow according to the left eyebrow and the left eye, and determines another position of a right eye shadow according to the right eyebrow and the right eye. Also, the processor analyzes average color values of the left eye shadow and the right eye shadow, and compares the average color values with default color values, or compares one of the average color values of the left eye shadow with another one of the average color values of the right eye shadow, for generating a comparison result, wherein, the display module is arranged to display the comparison result.

In comparison with related art, each embodiment disclosed in the present invention may provide a face look for the user when he or she is applying cosmetics through the body information analysis apparatus, and the user may receive an image analysis upon his or her eye shadows, so as to apply cosmetics more quickly and accurately.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
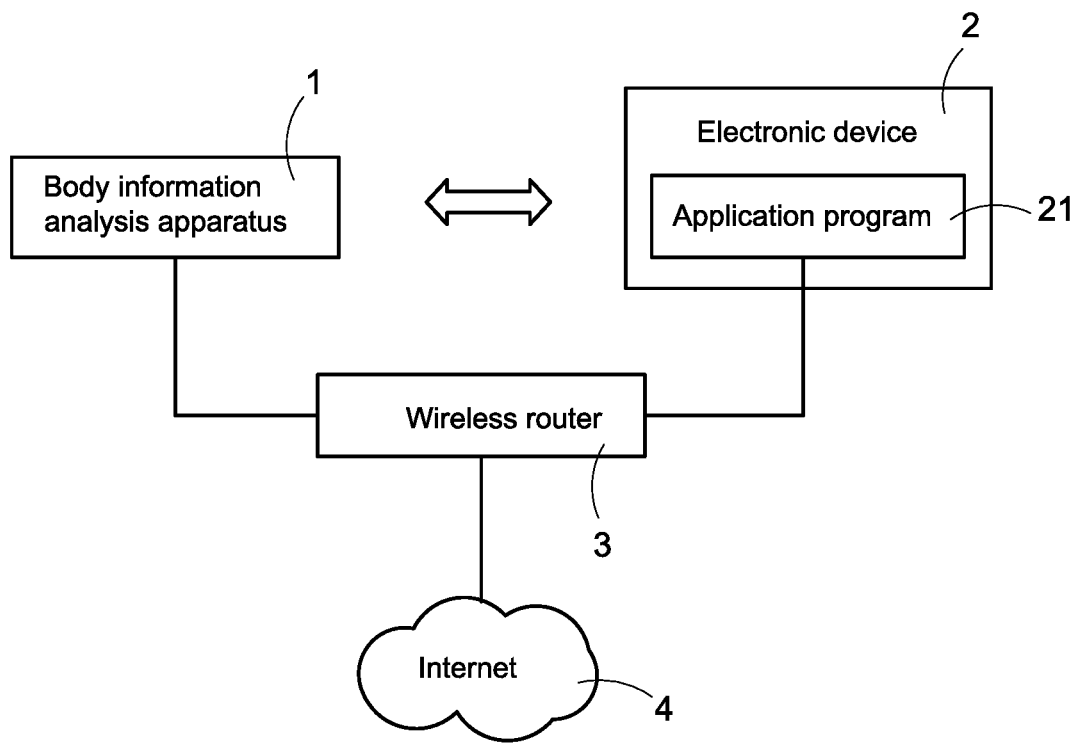
FIG. 1 is a schematic diagram of a system according to a first embodiment of the present invention.

FIG. 1 is a schematic diagram of a system according to a first embodiment of the present invention. The present invention discloses a body information analysis apparatus (referred to as the analysis apparatus hereinafter). The analysis apparatus is used to perform an eye shadow analysis method (referred to as the analysis method hereinafter), which assists a user in making up eye shadows on his or her own face more quickly and accurately.

In one embodiment, the user may perform setting on an analysis apparatus 1 through operating an electronic device 2. As shown in FIG. 1, the electronic device 2 is installed with an application program 21. In particular, the application program 21 may interconnect with the analysis apparatus 1 (for example, the application program 21 may be an application program created and provided by the manufacturer of the analysis apparatus 1). In the present invention, a user may operate the application program 21 executed by the electronic device 2 for completing multiple setting actions on the analysis apparatus 1 (such as registering face information, setting default values, etc.).

In one embodiment, the analysis apparatus 1 and the electronic device 2 are connecting to same wireless router 3 within the arranged area, and they can establish a wireless connection with each other or to the Internet 4 through the wireless router 3. Therefore, the analysis apparatus 1 may perform firmware updating, data uploading, data downloading, etc. through the Internet 4. Besides, the analysis apparatus 1 may collect user's body information and transmit the body information to a remote computer (not shown) through the Internet 4. Therefore, the user may check the body information from a remote end, and an offsite backup purpose may also be accomplished.

Moreover, the analysis apparatus 1 and the electronic device 2 may pair or connect directly through other wireless communication protocols (e.g., Bluetooth pairing, Zigbee connecting, RF connection, etc.), so as to transmit data, commands and signals with each other.

Figure 2:
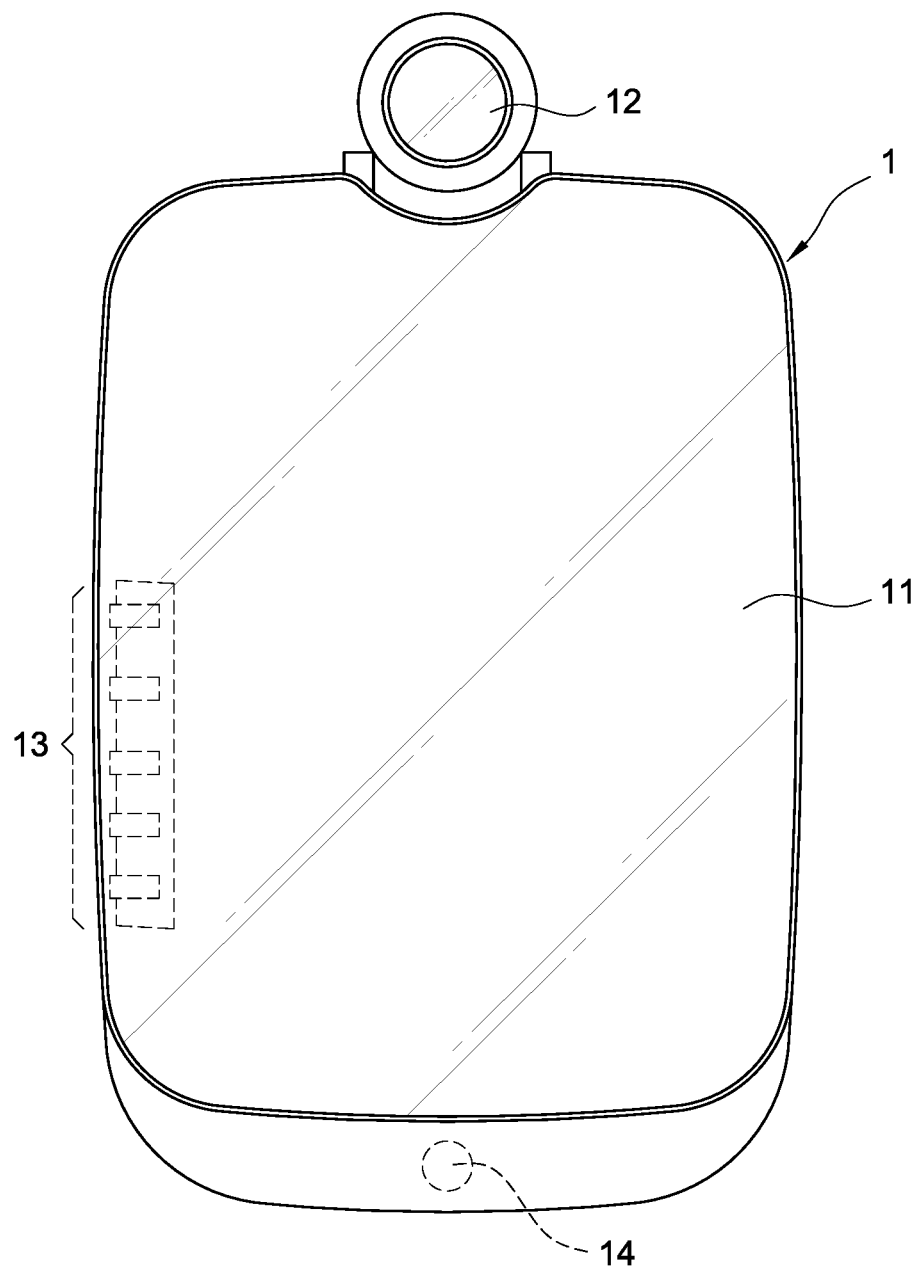
FIG. 2 is a schematic diagram of an analysis apparatus according to a first embodiment of the present invention.
Figure 3:
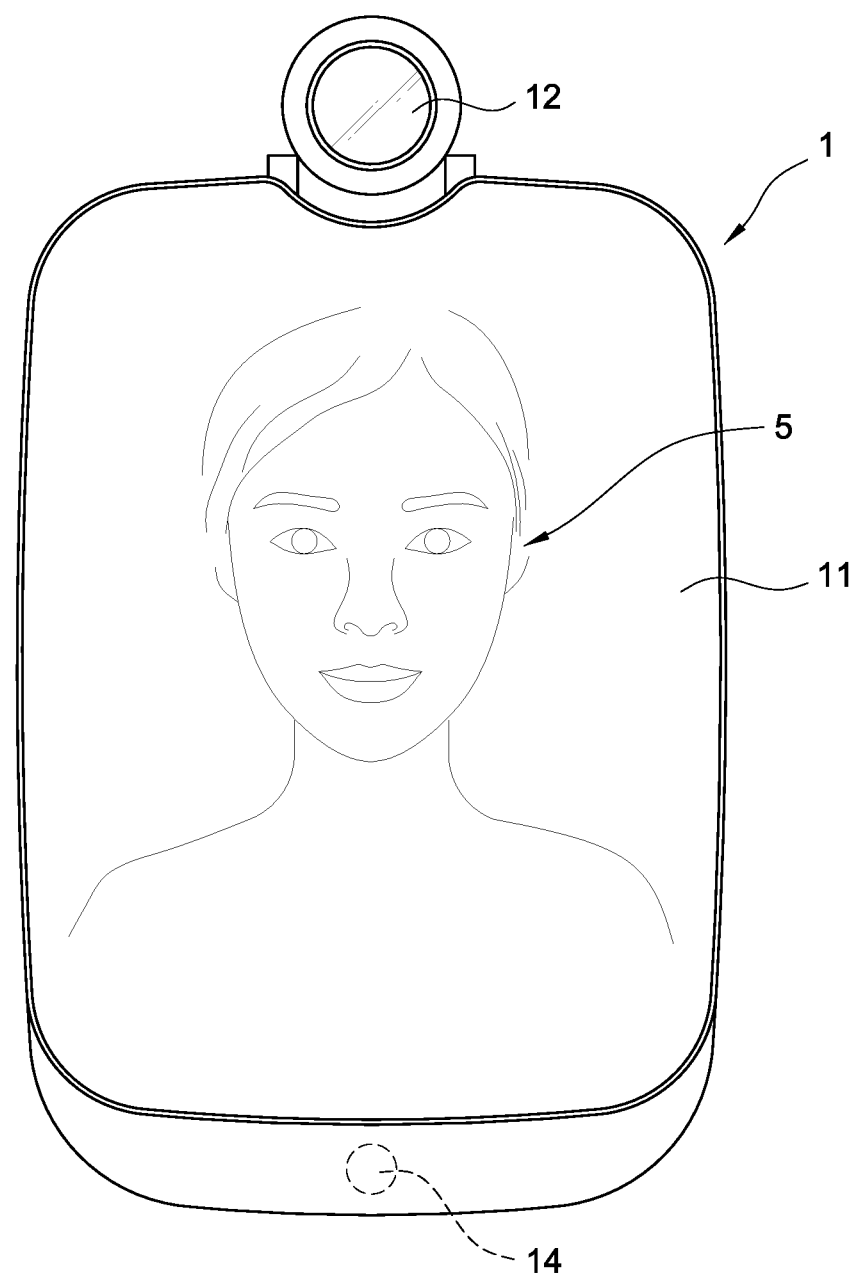
FIG. 3 is a schematic diagram of the analysis apparatus according to a second embodiment of the present invention.

Refers to FIG. 2 and FIG. 3, wherein FIG. 2 is a schematic diagram of an analysis apparatus according to a first embodiment of the present invention, and FIG. 3 is a schematic diagram of the analysis apparatus according to a second embodiment of the present invention. The analysis apparatus 1 in the present invention is basically arranged in the bedroom or the restroom of a user 5 and is used to inspect and analyze user's body information (e.g., the skin situation of the face, the neck, or the hands, etc.), so as to assist the user to apply cosmetics.

The analysis apparatus 1 includes a mirror screen 11. The analysis apparatus 1 displays a graphical user interface (GUI) through the mirror screen 11 for interacting with the user 5 while it is turned on. When the analysis apparatus 1 is turned off, the mirror screen 11 can also be deemed and used as a regular mirror for reflecting the face look of the user 5. One of the main objectives of the present invention is to assist the user 5 in applying cosmetics through the analysis apparatus 1. For doing so, the mirror screen 11 may simultaneously reflect the face look of the user 5 and display the GUI. Therefore, the analysis apparatus 1 may analyze the make-up of the user 5 while the user 5 is applying cosmetics for providing assistances to the user 5 (detailed described in the following).

In one embodiment, the mirror screen 11 may be a touch screen, and the user 5 may perform data input on the analysis apparatus 1 through the mirror screen 11.

The analysis apparatus 1 further includes an image capturing module 12, which is arranged on the analysis apparatus 1 and is adjustable for its setting angle. In one embodiment, the image capturing module 12 may capture high-resolution images for the user 5 (such as face images, neck images, hands images, etc.). Therefore, the analysis apparatus 1 may analyze body information and make-up progress of the user 5 through the captured images. In another embodiment, the image capturing module 12 may capture external messages (such as barcodes, QR codes, etc.), and the analysis apparatus 1 may obtain necessary data according to the content of the captured external messages.

The analysis apparatus 1 further includes multiple buttons 13. In one embodiment, the multiple buttons 13 may be physical buttons or touch keys, not limited thereto. The user 5 may operate the GUI (for example, controls the GUI to go back to a home page, to perform a pageup function, to perform a pagedown function, etc.), or leads the analysis apparatus 1 to quickly trigger corresponding functions (for example, turns on the mirror screen 11, turns off the mirror screen 11, turns on the image capturing module 12, etc.), by way of pressing the buttons 13.

The analysis apparatus 1 further includes one or more sensors 14 (such as temperature sensors, humility sensors, etc.). The sensors 14 are used to detect the environment values around the position where the analysis apparatus 1 is arranged. Therefore, the accuracy of the body information of the user 5 detected and analyzed by the analysis apparatus 1 may be enhanced in accordance with the sensor data. For an instance, if the sensors 14 comprise a pyroelectric infrared radial (PIR) sensor, it can detect whether the user 5 is entering the field of usage of the analysis apparatus 1 in any time. Therefore, the analysis apparatus 1 may leave the standby mode correspondingly for activating the image capturing module 12 for capturing the face image of the user 5 and performing the following analysis processes.

In another embodiment, the above sensors 14 may include a motion sensor. The analysis apparatus 1 may detect user's moving gesture (such as waving left, waving right, waving up, waving down, pushing forward, pulling backward, etc.) through the motion sensor. Therefore, the user 5 may perform data input on the analysis apparatus 1 through the moving gestures without physically touching the aforementioned mirror screen 11 or the buttons 13, so as to prevent the mirror screen 11 and the buttons 13 from retaining fingerprints.

Figure 4:
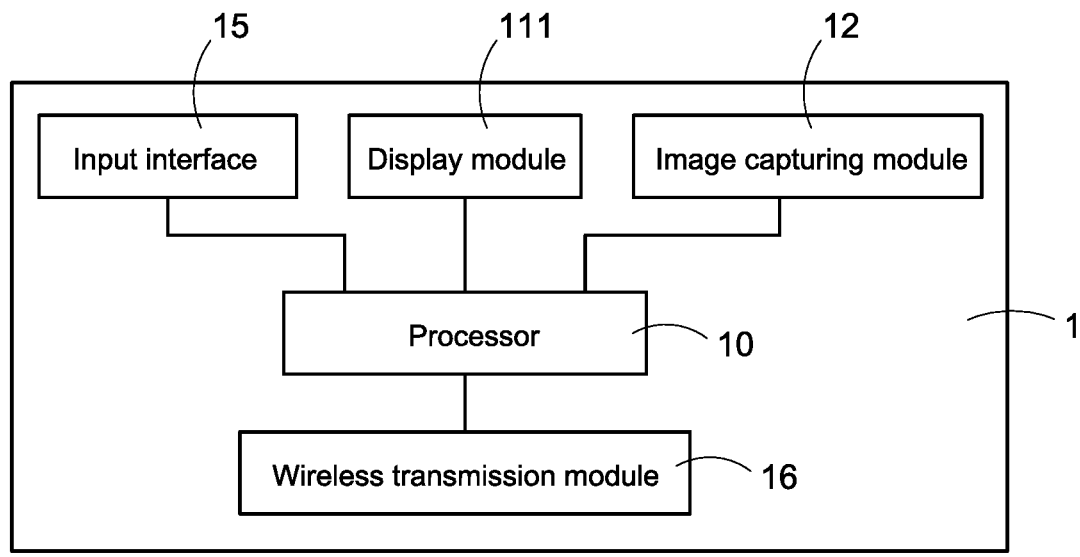
FIG. 4 is a block diagram of the analysis apparatus according to a third embodiment of the present invention.

FIG. 4 is a block diagram of the analysis apparatus according to a third embodiment of the present invention. As shown in FIG. 4, the analysis apparatus 1 mainly includes a processor 10, a display module 111, the image capturing module 12, an input interface 15, and a wireless transmission module 16, wherein the display module 111, the image capturing module 12, the input interface 15, and the wireless transmission module 16 are electrically connected with the processor 10.

In one embodiment, the image capturing module 12 may be a camera. The image capturing module 12 is used to capture external images and messages and provides the captured images and the captured messages to the analysis apparatus 1. The analysis apparatus 1 may perform recognitions on the user 5 through the captured images (for example, a face recognition, a neck recognition, a hand recognition, etc.) so as to analyze each feature of the user 5 (such as the face, the neck, the hand, etc.). Also, the analysis apparatus 1 may also perform relative settings through the content of the captured messages.

The display module 111 is used to display the aforementioned GUI. In one embodiment, the display module 111 is arranged inside the mirror screen 11. When the display module 111 is turned on, the light emitted from the display module 111 may penetrate through the mirror screen 11 and the GUI may be displayed right on the mirror screen 11. When the display module 111 is turned off, the user may regard and use the mirror screen 11 as a regular mirror. In one embodiment, the analysis apparatus 1 may adjust the light strength or the display area of the display module 111, thus the mirror screen 11 may simultaneously reflect the image of the user and also display the GUI thereon.

The analysis apparatus 1 may receive external input through the input interface 15, so the user may interact with the GUI or perform necessary settings on the analysis apparatus 1. In one embodiment, the input interface 15 may be the aforementioned sensors 14, so as to detect the gesture inputs from the user. In another embodiment, the input interface 15 may be the image capturing module 12, so as to capture the external images or the external messages. In a further embodiment, the input interface 15 may be the touch screen or the buttons 13, so as to receive input actions directly from the user. In another further embodiment, the input interface 15 may be a microphone, so as to receive external audio.

The wireless transmission module 16 assists the analysis apparatus 1 to connect to the Internet 4. In particular, the user may connect to the analysis apparatus 1 from a remote end through the Internet 4 to check each information recorded in the analysis apparatus 1 (such as the body information of the user) in any time.

The processor 10 is connected to the display module 111, the image capturing module 12, the input interface 15, and the wireless transmission module 16, and the processor 10 may include computer executable program codes (not shown). Upon executing the computer executable program codes, the processor 10 may control all the above modules of the analysis apparatus 1 and performs the analysis method of the present invention.

Figure 5:
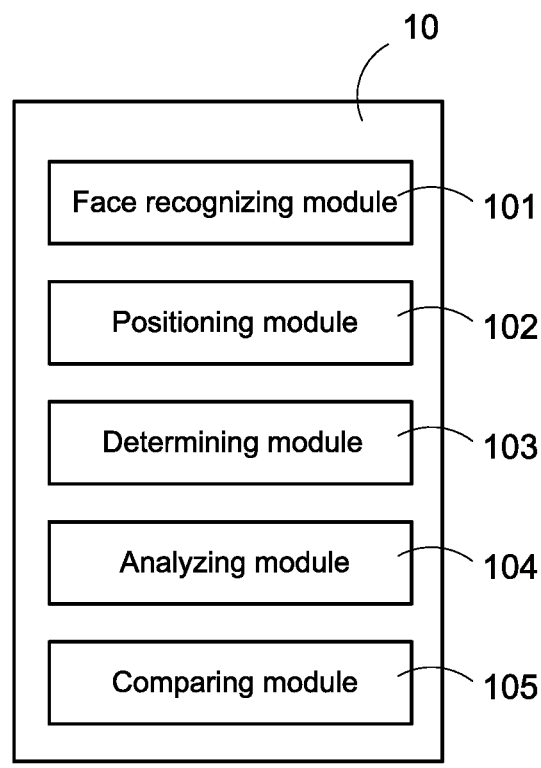
FIG. 5 is a schematic diagram of a processor according to a first embodiment of the present invention.

Refers to FIG. 5, which is a schematic diagram of a processor according to a first embodiment of the present invention. In particular, the processor 10 accomplishes each function of the analysis method of the present invention through executing the aforementioned computer executable program codes, and the computer executable program codes may be divided into multiple function modules set forth below according to different functions:

1. A face recognizing module 101, which is configured to recognize the external image captured by the image capturing module 12, so as to determine whether a face is present in the external image;

2. A positioning module 102, which is configured to perform positioning actions on the face presented in the external image through an algorithm, so as to obtain the positions of each facial feature of the face (for example, eyebrows, eyes, nose, mouth, etc.);

3. A determining module 103, which is configured to find suitable positions upon the face for the user to apply eye shadows according to the positions of the facial features obtained by the positioning module 102;

4. An analysing module 104, which is configured to execute image analysis to the aforementioned eye shadow positions, so as to obtain the current condition of the eye shadows of the user (such as the color brightness of the eye shadows, the color distribution of the eye shadows, etc.); and 5. A comparing module 105, which is configured to compare the conditions of the current eye shadows with default values, and informs the user about the comparison result (e.g., the color brightness is too bright, the color brightness is too dark, the color distribution is uneven, etc.), so as to provide make-up assistances for the user.

In other embodiment, the comparing module 105 may compare the condition of the current left eye shadow of the user with the condition of the current right eye shadow of the user, and informs the user about the comparison result (e.g., the color of the left eye shadow is brighter than that of the right eye shadow, the color of the right eye shadow is darker than that of the left eye shadow, etc.), instead of comparing the current condition of the two eye shadows with the default values. In other words, the comparising module 105 in this embodiment may use the condition of the right eye shadow as the default value in real-time to compare with the condition of the left eye shadow, and may use the condition of the left eye shadow as the default value in real-time to compare with the condition of the right eye shadow alternatively.

Figure 6A:
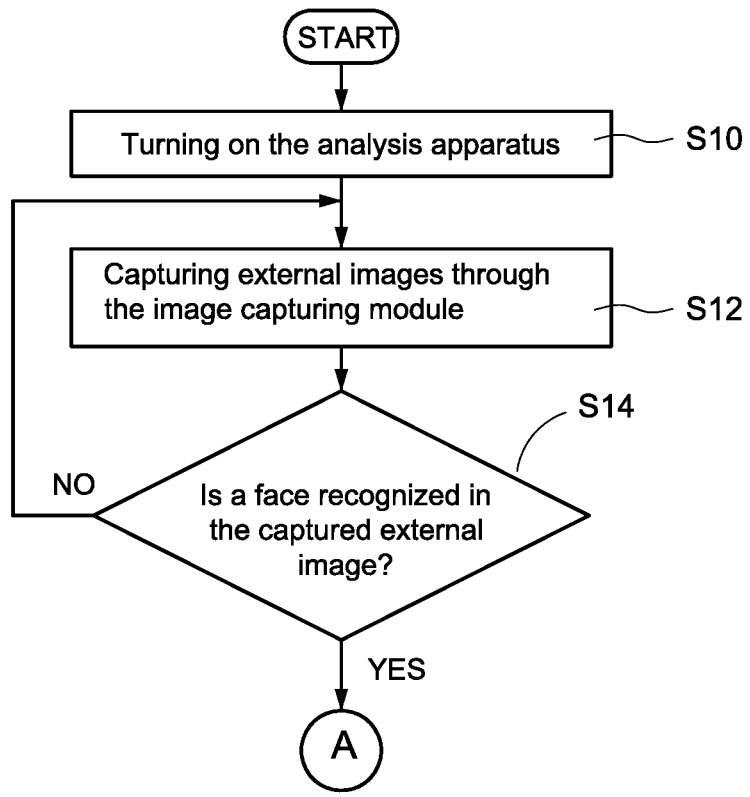
FIG. 6A is a first flowchart for analyzing the eye shadows according to a first embodiment of the present invention.
Figure 6B:
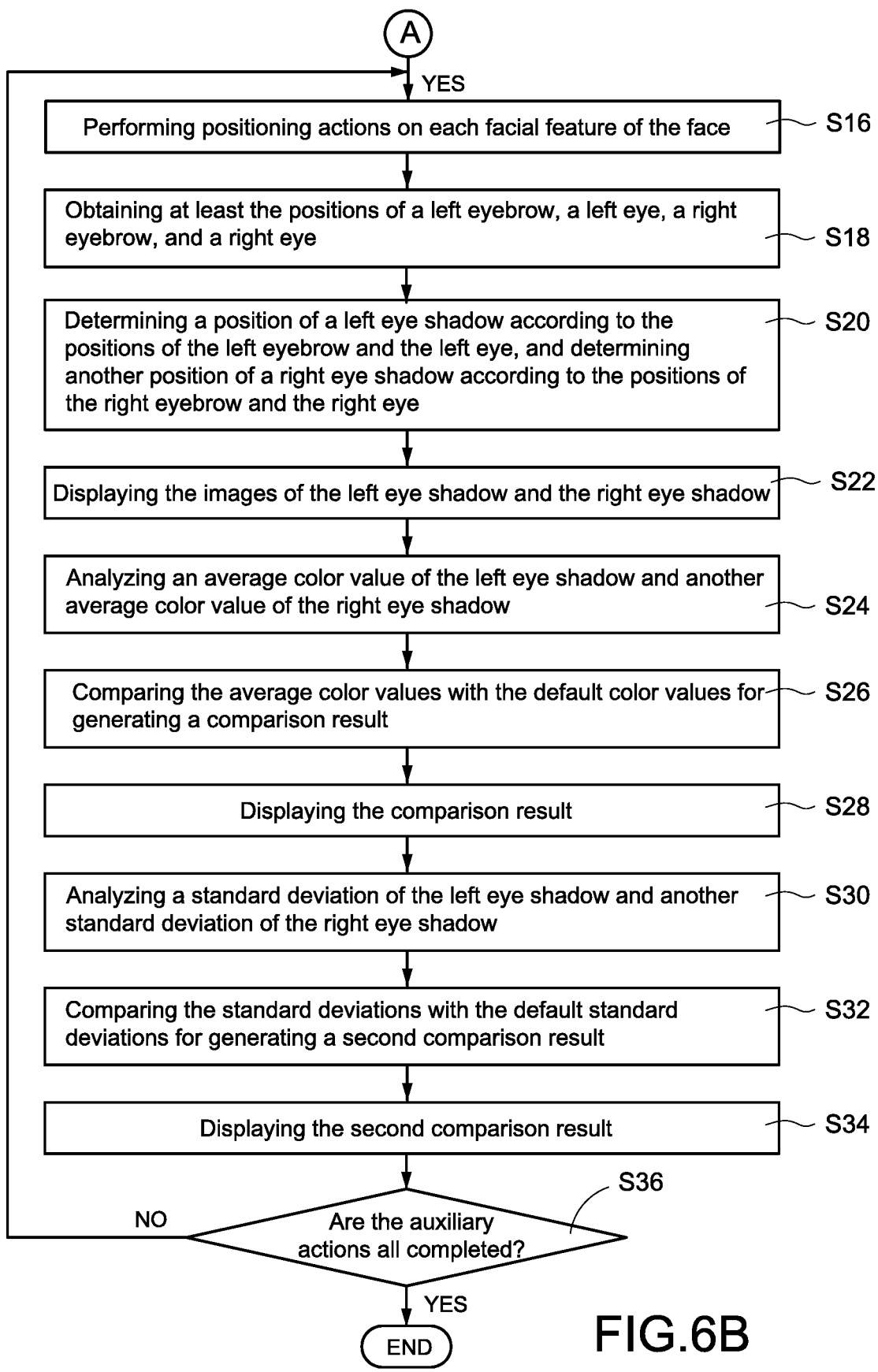
FIG. 6B is a second flowchart for analyzing the eye shadows according to the first embodiment of the present invention.

FIG. 6A is a first flowchart for analyzing the eye shadows according to a first embodiment of the present invention. FIG. 6B is a second flowchart for analyzing the eye shadows according to the first embodiment of the present invention. FIG. 6A and FIG. 6B are used to describe multiple steps of the analysis method of the present invention, and these steps are in particular adopted by the analysis apparatus 1 as shown in FIG. 1 to FIG. 5. More specific, the analysis apparatus 1 executes aforementioned computer executable program codes (i.e., the above function modules 101-105) through the processor 10 for accomplishing each step as described in the following.

As shown in FIG. 6A, to perform the analysis method through the analysis apparatus 1 of the present invention for assisting the user in applying cosmetics, the user first turns the analysis apparatus 1 on (step S10). In one embodiment, the user may trigger the touch screen or the buttons 13 to turn the analysis apparatus 1 on. In another embodiment, the analysis apparatus 1 may automatically enter a standby mode after receiving power, and the user may input gestures through the image capturing module 12 or the sensors 14 for activating the analysis apparatus 1 from the standby mode, but not limited thereto.

In particular, the analysis apparatus 1 may include multiple modes capable of different functions. In one embodiment, the analysis apparatus 1 is automatically entering an auxiliary mode for assisting the user in applying cosmetics after it is turned on. In another embodiment, the analysis apparatus 1 may automatically enter the standby mode after it is turned on, and enters the auxiliary mode after receiving the corresponding command from the user.

After being turned on, the analysis apparatus 1 keeps capturing external images through the image capturing module 12 (step S12), and the processor 10 of the analysis apparatus 1 keeps determining whether a face is present in the captured external images (step S14). In one embodiment, the processor 10 obtains an external image from the image obtaining module 12, and performs a face recognition on the external image through the face recognizing module 101, so as to determine whether a face is present in the external image or not.

If no face is present in the external image, the analysis apparatus 1 re-executes the step S12 and the step S14 for continually capturing and analyzing external images. For example, if only a bed, a door, or a chair is present in the external image (means there's no human exists in the bedroom), or only the body or the back of the user is present in the external image (means the user doesn't want to use the analysis apparatus 1), the analysis apparatus 1 will not perform the analysis method of the present invention.

As shown in FIG. 6B, if the processor 10 determines that a face is present in the external image after recognition, it then performs positioning actions on each part (basically on each facial feature) of the face (step S16). In one embodiment, the processor 10 may further determine if the size of the face is larger than a specific ratio or not (for example, the face occupies the external image more than 40%) after the face is determined present in the external image. In this scenario, the process 10 performs the positioning actions on each facial feature of the face only if the size of the face in the external image is larger than the specific ratio.

In one embodiment, the processor 10 renders the image of the face to the aforementioned positioning module 102 after determining the face is present in the external image, so the positioning module 102 may perform the positioning actions on the face image and then obtain at least the positions of a left eyebrow, a left eye, a right eyebrow, and a right eye of the user from the face image (step S18).

It should be noted that the positioning module 102 in the embodiment may perform the positioning actions on each facial feature of the face through a Dlib Face Landmark system, but not limited thereto.

Figure 7:
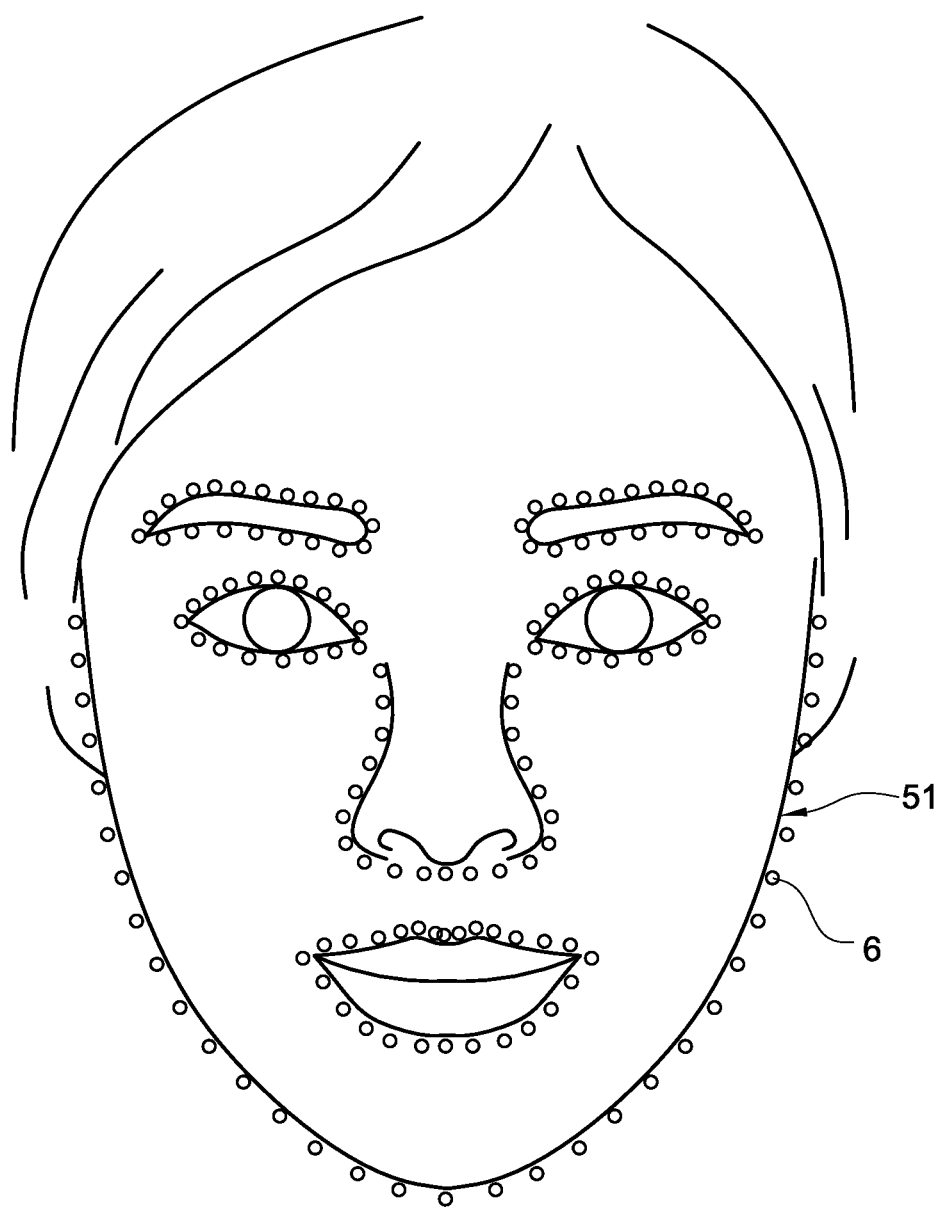
FIG. 7 is a schematic diagram for positioning a face.

FIG. 7 is a schematic diagram for positioning a face. When determining that a face is present in the external image, the processor 10 further performs analysis on the image of a face 51 through the Dlib Face Landmark system. The Dlib Face Landmark system is a common technical solution in the technical field, which can generate multiple positioning points 6 in the image of the face 51 after completing the analysis (such as 198 positioning points). Therefore, the Dlib Face Landmark system may figure out the positions of each facial feature of the face 51 according to the serial number, the shape, the order, etc. of the multiple positioning points 6 for accomplishing the positioning actions.

Refer back to FIG. 6B. The processor 10 may at least obtain the positions of the left eyebrow, the left eye, the right eyebrow, and the right eye of the user after the step S18. Next, the processor 10 may determine a position of a left eye shadow upon the face according to the positions of the left eyebrow and the left eye, and also another position of a right eye shadow upon the face according to the positions of the right eyebrow and the right eye (step S20). In one embodiment, the processor 10 is rendering a positioning result of the Dlib Face Landmark system to the aforementioned determining module 103, so the determining module 103 may calculate the positions of the left eye shadow and the right eye shadow respectively according to the positions of the left eyebrow, the left eye, the right eyebrow, and the right eye.

It should be noted that one of multiple objectives of the present invention is to assist the user in applying eye shadows, so the analysis apparatus 1 may control the display module 111 to optionally display the calculated positions of the left eye shadow and the right eye shadow for indication. In particular, the display module 111 may directly display the positions of the left eye shadow and the right eye shadow on the mirror screen 11 (for example, indicates the eye shadow positions through colored boxes), and makes the indicated eye shadow positions overlap the reflect image of the face 51 of the user right on the mirror screen 11. Therefore, the user may check and ensure the suitable positions upon the face for making up the eye shadows right through the mirror screen 11.

After the step S20, the analysis apparatus 1 may optionally display the images of the left eye shadow and the right eye shadow of the user through the display module 111 (step S22). In particular, the analysis apparatus 1 is to obtain the left eye shadow image and the right eye shadow image respectively through the image capturing module 12 after obtaining the positions of the left eye shadow and the right eye shadow, and display the images of the left eye shadow and the right eye shadow on the mirror screen 11 after an enlarging process. Therefore, the user may accurately realize the condition of the current eye shadows from the mirror screen 11, so as to improve the make-up actions.

Next, the process 10 analyzes an average color value of the left eye shadow and another average color value of the right eye shadow according to the images of the left eye shadow and the right eye shadow (step S24). In one embodiment, the processor 10 respectively renders the image of the left eye shadow and also the image of the right eye shadow to the aforementioned analyzing module 104, so the analyzing module 104 may analyze the average color values of the left eye shadow and the right eye shadow according to the rendered images. In this embodiment, the analyzing module 104 may apply multiple image analyzing algorithms of the related art for analyzing the average color values of the left eye shadow and the right eye shadow according to the images of the left eye shadow and the right eye shadow.

In particular, the calculation of the above average color values may be performed by the processor 10 through analyzing and indicating the obtained eye shadow images by different color space formats. The above color space formats may be RGB color space, HSV color space, HSL color space, etc., not limited thereto. According to the analysis method adopted by the processor 10, the processor 10 may use two or more color space formats simultaneously, or may take a measure of weight therefrom for analyzing.

For example, if the adopted color space format is the HSV color space, the color of each pixel of the obtained eye shadow images may be indicated by multiple measures of weight including "Hue", "Saturation", and "Value". If the adopted color space format is the RGB color space, the color of each pixel of the obtained eye shadow images may be indicated by multiple measures of weight including "Red", "Green", and "Blue".

After the step S24, the processor 10 may obtain the default color values, and compares the average color values with the default color values for generating a comparison result (step S26). In one embodiment, the processor 10 pre-stores the default color values by the comparing module 105, and renders the average color values to the comparing module 105 after the step S24. Therefore, the comparing module 105 may compare the average color value of the left eye shadow with one of the default color values for generating a comparison result, and may compare the average color value of the right eye shadow with another one of the default color values for generating another comparison result.

It should be mentioned that the aforementioned default color values may be standard colors or standard brightness pre-stored in the analysis apparatus 1, or may be the ideal colors or ideal brightness to the user and pre-set by the user. In a further embodiment, the analysis apparatus 1 may download user preferred make-up through the Internet 4, and the analysis apparatus 1 may perform image analyzing on the downloaded make-up for generating and storing the default color values.

In another embodiment, the processor 10 in the step S24 may compare the average color value of the left eye shadow with another average color value of the right eye shadow for generating the above comparing result. In this embodiment, the processor 10 is to simply determine whether the conditions of the left eye shadow and the right eye shadow are similar (for example, whether the colors brightness of the two eye shadows are similar or not), thus the default color values are unnecessary.

In the other words, the comparing module 105 in the step S26 may obtain the average color value of the right eye shadow in real-time for being the aforementioned default color value (such as a first default color value), and compares the average color value of the left eye shadow with the first default color value. Besides, the comparing module 105 may obtain the average color value of the left eye shadow in real-time for being the aforementioned default color value (such as a second default color value), and compares the average color value of the right eye shadow with the second default color value. Finally, the comparing module 105 generates the comparison result accordingly. However, the above description is just an embodiment, not intended to narrow down the scope of the claims of the present invention.

After the step S26, the analysis apparatus 1 may display the comparison result on the mirror screen 11 through the display module 111 (step S28). The user may obtain the condition about the current eye shadows right on the mirror screen 11 (for example, the brightness of the eye shadows are higher than or lower than the standard brightness), so as to be served for assistances by the analysis apparatus 1.

In one embodiment, the average color values and the default color values mentioned above are pixel values within 0 to 255, the comparison result is a percentage, and the comparing module 105 generates the comparison result through executing the formula:

$$\frac{|\text{default color values} - \text{average color values}|}{255} * 100\%.$$

However, the above description is only an embodiment, not intended to narrow down the scope of claims of the present invention.

In one embodiment, the processor 10 further analyzes a standard deviation (SD) of the left eye shadow and another standard deviation of the right eye shadow according to the images of the left eye shadow and the right eye shadow (step S30). In one embodiment, the processor 10 renders the images of the left eye shadow and the right eye shadow to the analyzing module 104, so the analyzing module 104 may analyze the standard deviations of the left eye shadow and the right eye shadow accordingly. Similarly, the analyzing module 104 may apply multiple image analyzing algorithms of the related art to analyze the standard deviations of the left eye shadow and the right eye shadow according to the images of the left eye shadow and the right eye shadow.

After the step S30, the processor 10 may obtain pre-stored default standard deviations, and compares the above standard deviations with the default standard deviations for generating a second comparison result (step S32). In one embodiment, the processor 10 may pre-store the default standard deviations by the aforementioned comparing module 105, and renders the obtained standard deviations to the comparing module 105 after the step S30. Therefore, the comparing module 105 may compare the standard deviation of the left eye shadow with one of the default standard deviations, and compare the standard deviation of the right eye shadow with another one of the default standard deviations, so as to generate the above second comparing result.

Similar to the above average color values, the processor 10 in the step S32 may also compare one of the standard deviations of the left eye shadow with another one of the standard deviations of the right eye shadow for generating the second comparing result. In this circumstance, the processor 10 is to simply determine whether the color distribution of the left eye shadow and the right eye shadow are similar, thus the default standard deviations are unnecessary.

After the step S32, the analysis apparatus 1 may display the second comparison result on the mirror screen 11 through the display module 111 (step S34). The user may check whether the current eye shadows have uneven issues or not (for example, the color distribution of the eye shadows may lower than the standard color distribution), and proceeds with repairing actions to which are uneven.

In one embodiment, the standard deviations are similar to the aforementioned average color values, which may be pixel values within 0 to 255. The second comparison result is similar to the aforementioned comparison result, which may be a percentage. In this embodiment, the comparing module 105 may generate the second comparison result through executing the formula:

$$\frac{|\text{default standard deviations} - \text{standard deviations}|}{255} * 100\%.$$

However, the above description is only one of the exemplary embodiments, not intended to narrow down the scope of the claims of the present invention.

Next, the analysis apparatus 1 determines whether the auxiliary actions provided for the user are completed (step S36). Before the auxiliary actions are completed, the analysis apparatus 1 re-executes the step S16 to the step S34 for continually recognizing the face 51 of the user, positioning the facial features of the face 51, obtaining the images and the positions of the left eye shadow and the right eye shadow, analyzing the average color values and the standard deviations of the eye shadows, and generating and displaying the comparison result and the second comparison result. Otherwise, once the auxiliary actions are all completed, the analysis apparatus 1 terminates the analysis method. Through re-executing the aforementioned step S16 to step S34, the analysis apparatus 1 and the analysis method of the present invention may accomplish a real-time make-up auxiliary function.

For an instance, the analysis apparatus 1 may perform analysis on the face 51 of the user, and display the comparison result for indicating that the color of the current left eye shadow of the user is 5% darker than the standard color. According to the comparison result, the user may repair the left eye shadow. In the middle of the repairing, the analysis apparatus 1 keeps analyzing the face 51 of the user, and it adjusts the comparison result for indicating that the color of the current left eye shadow of the user is now 3% darker than the standard color.

According to the adjusted comparison result, the user may keep repairing the left eye shadow. Still the analysis apparatus 1 keeps analyzing the face 51 of the user. Next, the analysis apparatus 1 again adjusts the comparison result for indicating that the color of the current left eye shadow of the user is now 1.5% darker than the standard color, and so on. Therefore, the user may keep repairing the eye shadows until the color/brightness of the eye shadows are identical or similar to the standard color/standard brightness.

In one embodiment, the analysis apparatus 1 in the step S36 is to determine whether the analysis apparatus 1 is turned off or not. In this embodiment, the analysis apparatus 1 may re-execute the step S16 to the step S34 before it is turned off, and the analysis apparatus 1 may terminate the analysis method after that. Therefore, the analysis apparatus 1 may keep providing the real-time make-up auxiliary function while it is on.

In one embodiment, the analysis apparatus 1 in the step S36 is to determine whether the comparison result (and the second comparison result) complies with a completion standard or not. For example, the analysis apparatus 1 may determine whether the above average color values are equal to or similar to the default color values according to the comparison result, and determines whether the above standard deviations are equal to or similar to the default standard deviations according to the second comparison result. Next, the analysis apparatus 1 may determine that the comparison result (and the second comparison result) complies with the completion standard once the average color values are equal to or similar to the default color values and the standard deviations are equal to or similar to the default standard deviations.

Similarly, the analysis apparatus 1 in this embodiment may re-execute the step S16 to the step S34 before the comparison result (and the second comparison result) complies with the completion standard, and may terminate the analysis method after that.

Figure 8:
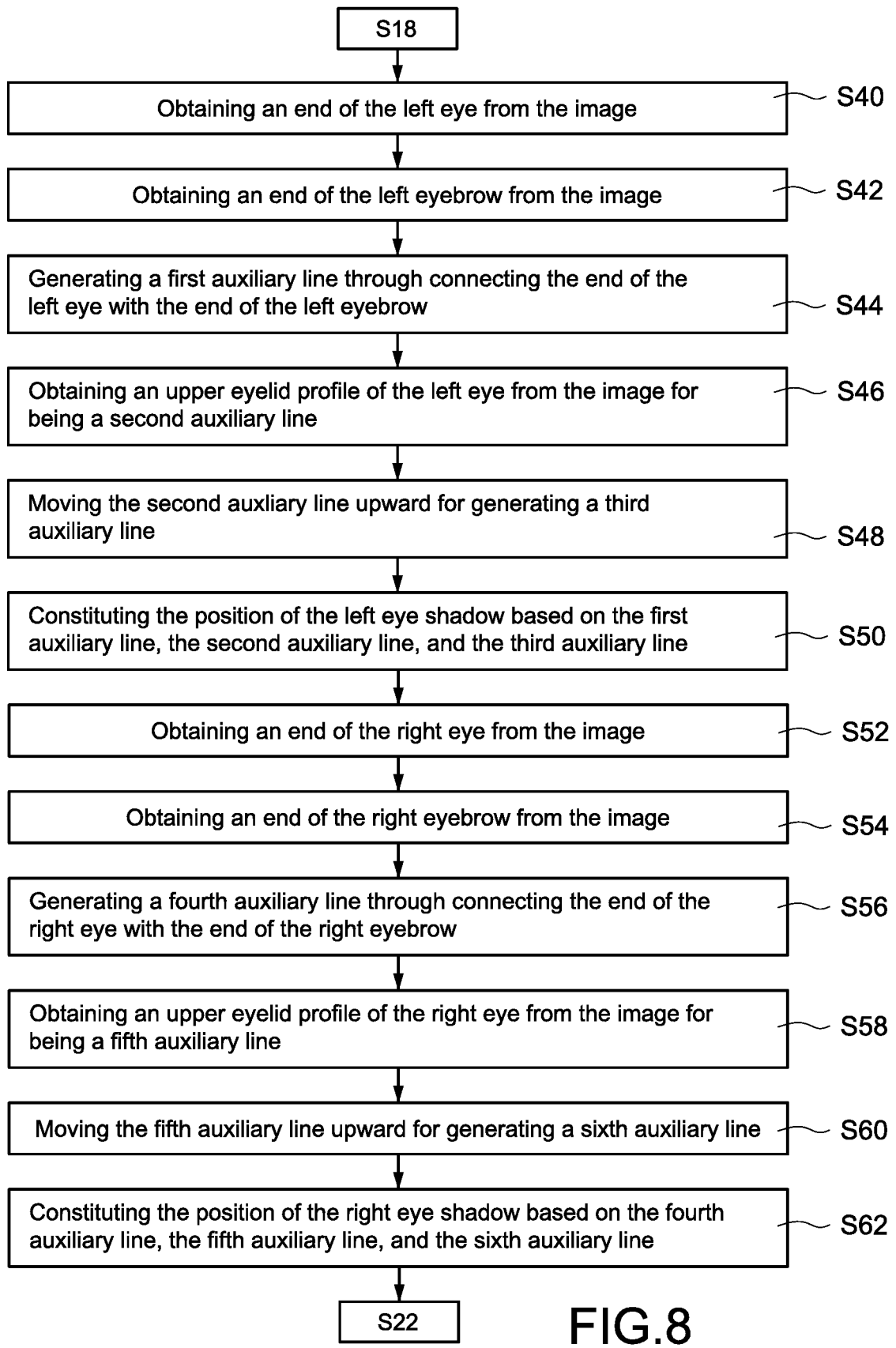
FIG. 8 is a flowchart for analyzing the eye shadows according to a second embodiment of the present invention.

FIG. 8 is a flowchart for analyzing the eye shadows according to a second embodiment of the present invention. FIG. 8 is used to detailed describe the step S20 of FIG. 6B, so as to interpret how the determining module 103 of the processor 10 finds the eye shadow positions according to the positions of a left eyebrow, a left eye, a right eyebrow, and a right eye.

In particular, after the step S18 of FIG. 6B, the determining module 103 may obtain at least the positions of the left eyebrow, the left eye, the right eyebrow, and the right eye upon the face of the user. Next, the determining module 103 executes the following steps S40 to S50 for determining the position of the left eye shadow, and also executes the following steps S52 to S62 for determining the position of the right eye shadow.

In one embodiment, the determining module 103 may alternatively determine the position of the left eye shadow or the position of the right eye shadow first. In another embodiment, the determining module 103 may determine the positions of both the left eye shadow and the right eye shadow simultaneously. That is, the steps S40 to S50 and the steps S52 to S62 do not have a constant execution order. For the sake of understanding, the following descriptions will follow the order of the flowchart shown in FIG. 8, which the determining module 103 first determines the left eye shadow position and then the right eye shadow position, for an example, but not intended to narrow down the scope of the claims of the present invention.

First, the determining module 103 may obtain an end of the left eye from the image of the face (step S40), and also obtains an end of the left eyebrow from the image of the face (step S42). Next, the determining module 103 generates a first auxiliary line through connecting the end of the left eye with the end of the left eyebrow (step S44). Further, the determining module 103 may obtain an upper eyelid profile of the left eye from the image of the face, and regards the upper eyelid profile of the left eye directly as a second auxiliary line (step S46). Next, the determining module 103 moves the second auxiliary line upward for generating a third auxiliary line (step S48). Finally, the determining module 103 may constitute the position of the left eye shadow based on the first auxiliary line, the second auxiliary line, and the third auxiliary line (step S50).

In one embodiment, the analysis apparatus 1 may optionally control the display module 111 to display the first auxiliary line, the second auxiliary line, and the third auxiliary line on the mirror screen 11 for being checked and inspected by the user.

Next, the determining module 103 may obtain an end of the right eye from the image of the face (step S52), and also obtains an end of the right eyebrow from the image of the face (step S54). Next, the determining module 103 generates a fourth auxiliary line through connecting the end of the right eye with the end of the right eyebrow (step S56). Further, the determining module 103 may obtain an upper eyelid profile of the right eye from the image of the face, and regards the upper eyelid profile of the right eye directly as a fifth auxiliary line (step S58). Next, the determining module moves the fifth auxiliary line upward for generating a sixth auxiliary line (step S60). Finally, the determining module 103 may constitute the position of the right eye shadow based on the fourth auxiliary line, the fifth auxiliary line, and the sixth auxiliary line (step S62).

Similarly, the analysis apparatus 1 may optionally control the display module 111 to display the fourth auxiliary line, the fifth auxiliary line, and the sixth auxiliary line on the mirror screen 11 for being checked and inspected by the user.

Figure 9A:
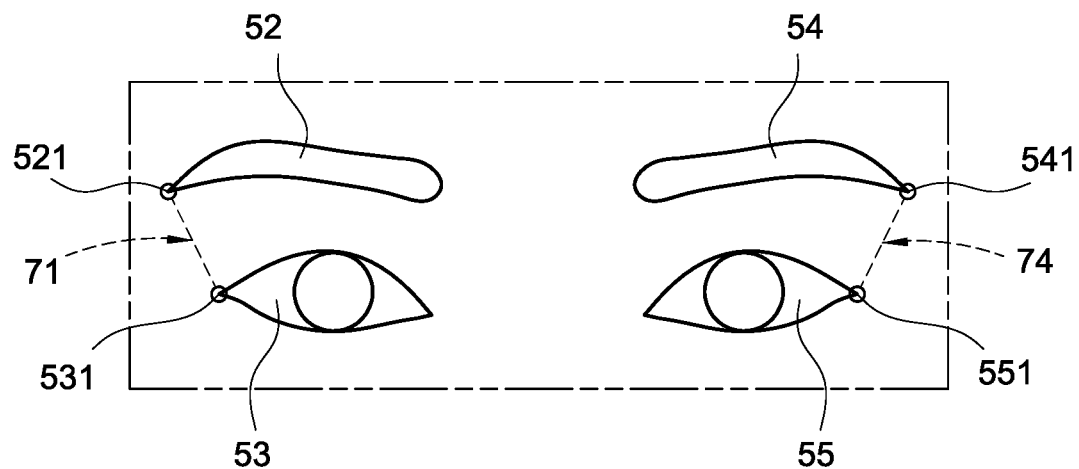
FIG. 9A is a diagram showing first analyzing actions according to a first embodiment of the present invention.
Figure 9B:
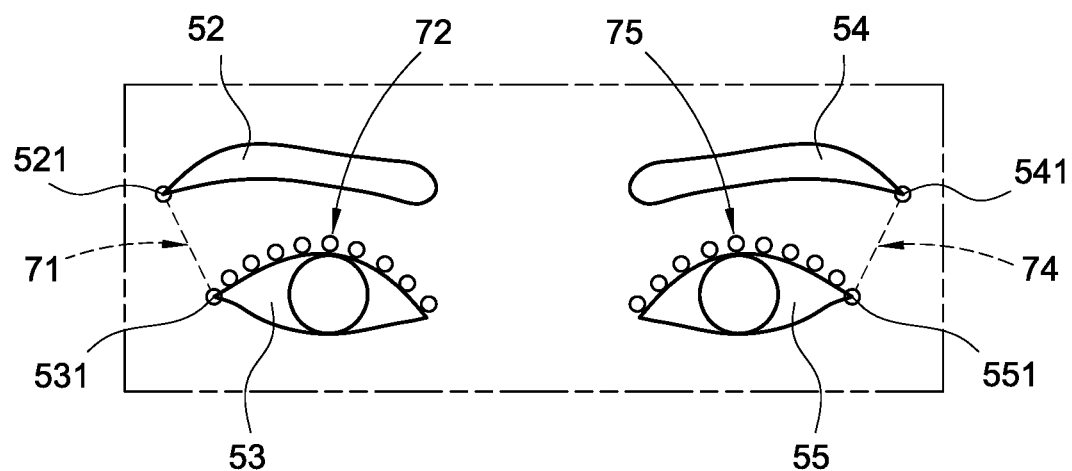
FIG. 9B is a diagram showing second analyzing actions according to the first embodiment of the present invention.
Figure 9C:
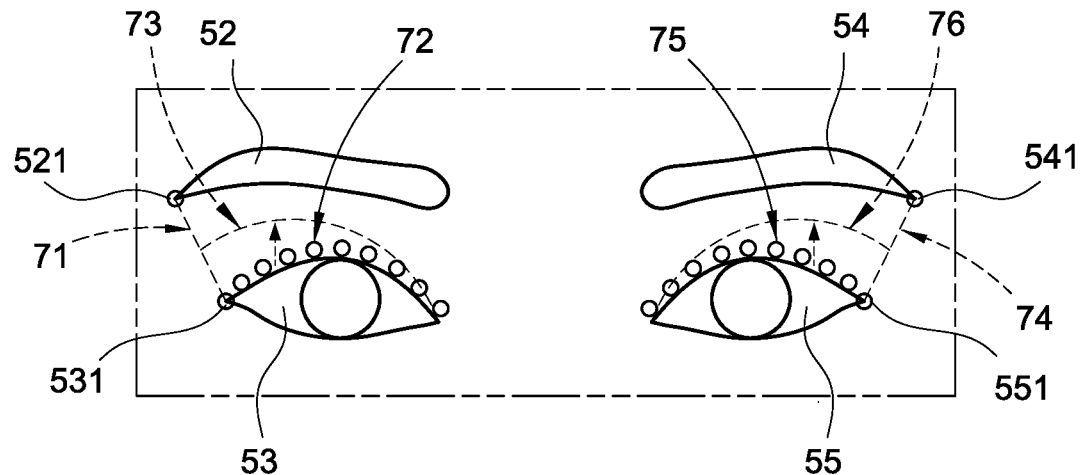
FIG. 9C is a diagram showing third analyzing actions according to the first embodiment of the present invention.
Figure 9D:
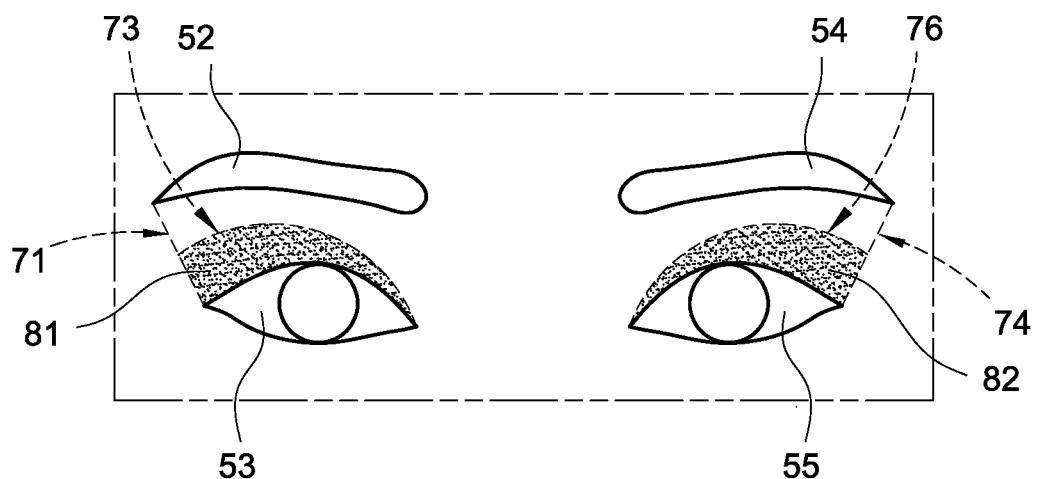
FIG. 9D is a diagram showing fourth analyzing actions according to the first embodiment of the present invention.

Refer to FIG. 9A to FIG. 9D, wherein FIG. 9A is a diagram showing first analyzing actions according to a first embodiment of the present invention, FIG. 9B is a diagram showing second analyzing actions according to the first embodiment of the present invention, FIG. 9C is a diagram showing third analyzing actions according to the first embodiment of the present invention, and FIG. 9D is a diagram showing fourth analyzing actions according to the first embodiment of the present invention. The embodiment of FIG. 9A to FIG. 9D is based on the determining module 103 to simultaneously determine the positions of both left eye shadow and right eye shadow, but not intended to narrow down the scope of the claims of the present invention.

As shown in FIG. 9A, the determining module 103 may obtain the positions of the left eyebrow 52, the left eye 53, the right eyebrow 54, and the right eye 55 from the image of the face after the step S18 of FIG. 6B. Next, the determining module 103 may generate a first auxiliary line 71 through connecting an end of the left eyebrow 521 with an end of the left eye 531, and generating a fourth auxiliary line 74 through connecting an end of the right eyebrow 541 with an end of the right eye 551.

In this embodiment, the determining module 103 mainly obtain the position of one of the positioning points (such as the positioning points 6 as shown in FIG. 7) corresponding to the end of the left eyebrow 521, and also obtains the position of another one of the positioning points corresponding to the end of the left eye 531, and connects the two obtained positioning points for obtaining the first auxiliary line 71. Besides, the determining module 103 further obtains the two positions of the positioning points respectively corresponding to the end of the right eyebrow 541 and the end of the right eye 551, and connects the two positioning points for obtaining the fourth auxiliary line 74.

Next, as shown in FIG. 9B, the determining module 103 obtains an upper eyelid profile of the left eye 53 for directly being a second auxiliary line 72, and also obtains another upper eyelid profile of the right eye 55 for directly being a fifth auxiliary line 75. As shown in FIG. 9B, one end of the second auxiliary line 72 is connected with the first auxiliary line 71, and one end of the fifth auxiliary line 75 is connected with the fourth auxiliary line 74. In other words, both the first auxiliary line 71 and the second auxiliary line 72 are passing through the end of the left eye 531, and both the fourth auxiliary line 74 and the fifth auxiliary line 75 are passing through the end of the right eye 551.

In this embodiment, the determining module 103 mainly obtains all positioning points (such as the positioning points 6 as shown in FIG. 7) corresponding to the upper eyelid profile of the left eye 53, and connects all the positioning points corresponding to the upper eyelid profile of the left eye 53 for generating the second auxiliary line 72. Also, the determining module 103 obtains all positioning points corresponding to the another upper eyelid profile of the right eye 55, and connects all the positioning points corresponding to the upper eyelid profile of the right eye 55 for generating the fourth auxiliary line 75.

As shown in FIG. 9C, the determining module 103 then moves the second auxiliary line 72 upward for generating a third auxiliary line 73, and also moves the fifth auxiliary line 75 upward for generating a sixth auxiliary line 76. As shown in FIG. 9C, one end of the third auxiliary line 73 is connected with the first auxiliary line 71 and the other is connected with the second auxiliary line 72. One end of the sixth auxiliary line 76 is connected with the fourth auxiliary line 74 and the other is connected with the fifth auxiliary line 75.

In one embodiment, the determining module 103 moves the second auxiliary line 72 upward to a middle position of the first auxiliary line 71 for generating the third auxiliary line 73, and moves the fifth auxiliary line 75 upward to a middle position of the fourth auxiliary line 74 for generating the sixth auxiliary line 76. In another embodiment, the user may set an eye shadow height through the above input interface 15, the determining module 103 in this embodiment may move the second auxiliary line 72 upward to the set eye shadow height of the first auxiliary line 71 for generating the third auxiliary line 73, and also moves the fifth auxiliary line 75 upward to the set eye shadow height of the fourth auxiliary line 74 for generating the sixth auxiliary line 76.

As shown in FIG. 9D, after the six auxiliary lines 71-76 are generated, the determining module 103 may then indicate the position of a left eye shadow 81 based on the first auxiliary line 71, the second auxiliary line 72, and the third auxiliary line 73, and may indicate another position of a right eye shadow 82 based on the fourth auxiliary line 74, the fifth auxiliary line 75, and the sixth auxiliary line 76. When performing image analyzing in the upcoming steps, the aforementioned analyzing module 104 may only perform image analyzing on the indicated positions of the left eye shadow 81 and the right eye shadow 82, therefore, the work loading of the processor 10 may be reduced, and the accuracy of the analyzing result may be greatly improved.

Figure 10:
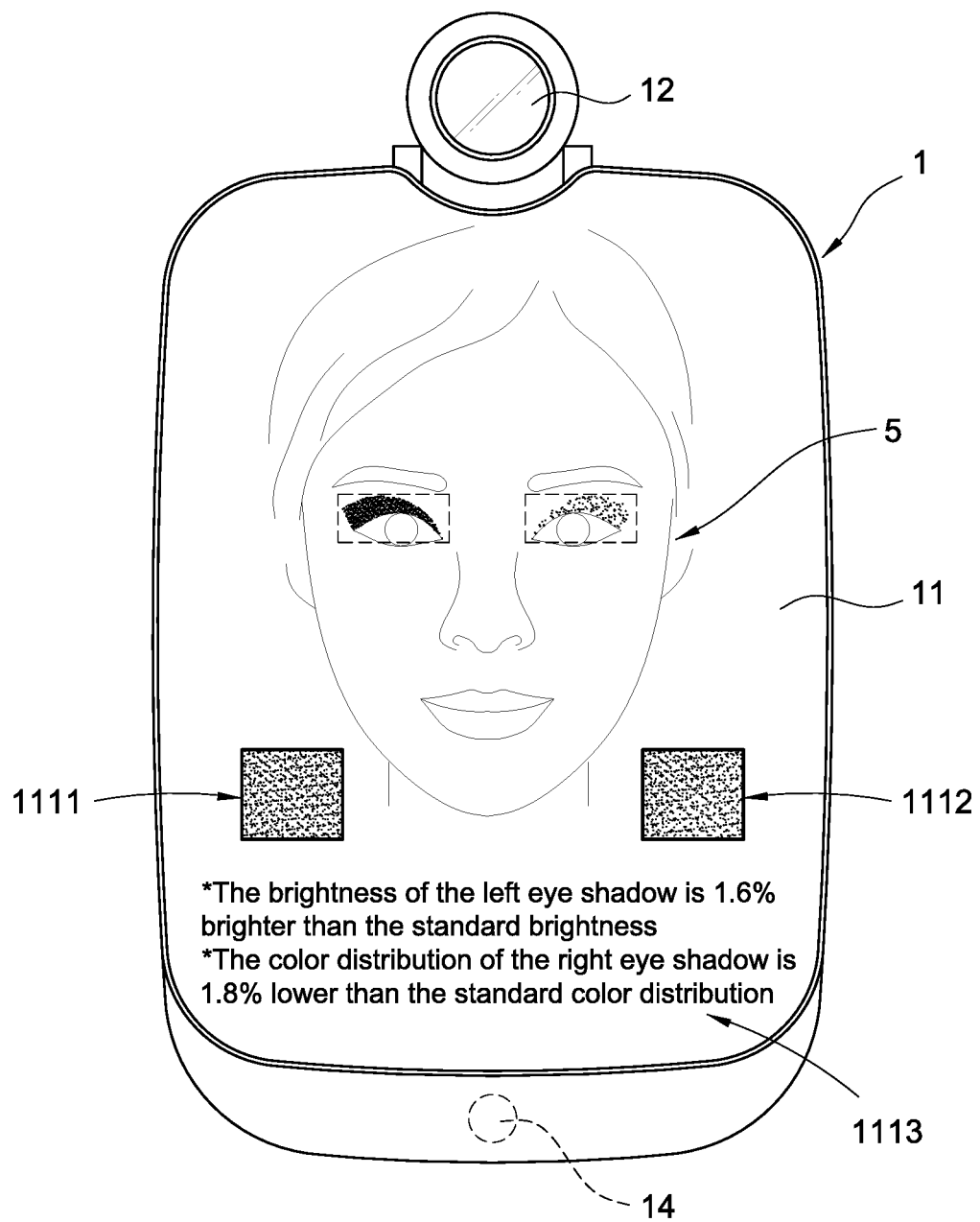
FIG. 10 is a schematic diagram of the analysis apparatus according to a fourth embodiment of the present invention.

FIG. 10 is a schematic diagram of the analysis apparatus according to a fourth embodiment of the present invention. As mentioned above, the analysis apparatus 1 of the present invention is to capture the face image of the user 5 in real-time and analyze the condition of the two eye shadows 81 and 82 of the user. Besides, the analysis apparatus 1 may provide image displaying areas 1111, 1112 on the mirror screen 11, so as to real-time display the images of the current left eye shadow 81 and the current right eye shadow 82 of the user 5 respectively.

More specific, the analysis apparatus 1 may first perform an enlargement processing on the images of the left eye shadow 81 and the right eye shadow 82, and then controls the display module 111 to display the enlarged image of the left eye shadow 81 and also the enlarged image of the right eye shadow 82 respectively on the image displaying areas 1111, 1112 of the mirror screen 11.

As shown in FIG. 10, the mirror screen 11 further includes an information displaying area 1113. The analysis apparatus 1 may control the display module 111 to display the aforementioned comparison result (and the second comparison result) on the information displaying area 1113 of the mirror screen 11.

In this embodiment, the user 5 may see a reflect image of his/her own face right on the mirror screen 11, and may see the enlarged image of the left eye shadow 81 and also the enlarged image of the right eye shadow 82 through the image displaying areas 1111 and 1112, and may realize whether the conditions (such as colors, distributions, etc.) of the left eye shadow 81 and the right eye shadow 82 differ from a standard or not through the information displaying area 1113 (for example, the comparing result in FIG. 10 indicates that the brightness of the left eye shadow 81 is 1.6% brighter than the standard brightness, and the color distribution of the right eye shadow 82 is 1.8% lower than the standard color distribution). Therefore, the analysis apparatus 1 may effectively assist the user 5 in applying cosmetics for the eye shadows, so as to increase the make-up speed of the user 5 and also optimize the make-up quality.

As the skilled person will appreciate, various changes and modifications can be made to the described embodiment. It is intended to include all such variations, modifications and equivalents which fall within the scope of the present invention, as defined in the accompanying claims.

What is claimed is:

1. An eye shadow analysis method adopted by a body information analysis apparatus, comprising:
   a) capturing an external image through an image capturing module of the body information analysis apparatus;
   b) performing positioning actions to each facial feature of a face once the face is recognized from the external image by a processor of the body information analysis apparatus;
   c) obtaining positions of a left eyebrow, a left eye, a right eyebrow, and a right eye upon the face following step b);
   d) determining a position of a left eye shadow upon the face according to the positions of the left eyebrow and the left eye by the processor, comprising:
      d1) obtaining an end of the left eye upon the face;
      d2) obtaining an end of the left eyebrow upon the face;
      d3) generating a first auxiliary line through connecting the end of the left eye with the end of the left eyebrow;
      d4) obtaining an upper eyelid profile of the left eye for being a second auxiliary line, wherein one end of the second auxiliary line is connected with the first auxiliary line;
      d5) moving the second auxiliary line upward for generating a third auxiliary line, wherein one end of the third auxiliary line is connected with the first auxiliary line and another end of the third auxiliary line is connected with the second auxiliary line; and
      d6) constituting the position of the left eye shadow based on the first auxiliary line, the second auxiliary line, and the third auxiliary line;
   e) determining another position of a right eye shadow upon the face according to the positions of the right eyebrow and the right eye by the processor;
   f) analyzing average color values of the left eye shadow and the right eye shadow respectively by the processor;

g) comparing the average color values with default color values, or comparing one of the average color values of the left eye shadow with another one of the average color values of the right eye shadow, and generating a comparison result; and h) displaying the comparison result through a display module of the body information analysis apparatus.

2. The eye shadow analysis method in claim 1, wherein the step d5) is to move the second auxiliary line upward to a middle position of the first auxiliary line.

3. The eye shadow analysis method in claim 1, wherein the step e) further comprises following steps:
   e1) obtaining an end of the right eye upon the face;
   e2) obtaining an end of the right eyebrow upon the face;
   e3) generating a fourth auxiliary line through connecting the end of the right eye with the end of the right eyebrow;
   e4) obtaining an upper eyelid profile of the right eye for being a fifth auxiliary line, wherein one end of the fifth auxiliary line is connected with the fourth auxiliary line;
   e5) moving the fifth auxiliary line upward for generating a sixth auxiliary line, wherein one end of the sixth auxiliary line is connected with the fourth auxiliary line and another end of the sixth auxiliary line is connected with the fifth auxiliary line; and
   e6) constituting the position of the right eye shadow based on the fourth auxiliary line, the fifth auxiliary line, and the sixth auxiliary line.

4. The eye shadow analysis method in claim 3, wherein the step e5) is to move the fifth auxiliary line upward to a middle position of the fourth auxiliary line.

5. The eye shadow analysis method in claim 3, further comprising following steps:
   i1) determining whether the body information analysis apparatus is turned off; and
   i2) re-executing the step b) to the step h) before the body information analysis apparatus is turned off.

6. The eye shadow analysis method in claim 3, further comprising following steps:
   j1) determining whether the comparison result is matching with a completion standard; and
   j2) re-executing the step b) to the step h) before the comparison result is determined matching with the completion standard.

7. The eye shadow analysis method in claim 3, further comprising following steps:
   k) analyzing standard deviations (SDs) of the left eye shadow and the right eye shadow respectively by the processor;
   l) comparing the standard deviations with default standard deviations, or comparing one of the standard deviations of the left eye shadow with another one of the standard deviations of the right eye shadow, and generating a second comparison result; and
   m) displaying the second comparison result on the display module.

8. The eye shadow analysis method in claim 3, wherein the step b) is to perform the positioning actions to each facial feature of the face through a Dlib Face Landmark system.

9. A body information analysis apparatus, comprising:
   an image capturing module, arranged to capture an external image;
   a display module; and
   a processor electrically connected with the image capturing module and the display module, configured to recognize the external image for determining whether a face is present in the external image through a face recognizing module, and perform positioning actions to each facial feature of the face through a positioning module once the face is recognized from the external image for obtaining positions of a left eyebrow, a left eye, a right eyebrow, and a right eye from the face;
   wherein, the process is configured to determine a position of a left eye shadow upon the face according to the positions of the left eyebrow and the left eye through a determining module, determine another position of a right eye shadow upon the face according to the positions of the right eyebrow and the right eye through the determining module, and analyze average color values of the left eye shadow and the right eye shadow through executing an algorithm by an analyzing module, and the processor is configured to compare the average color values with default color values, or compare one of the average color values of the left eye shadow with another one of the average color values of the right eye shadow through a comparing module, for generating a comparison result;
   wherein, the processor is configured to control the determining module to execute following activities:
      obtaining an end of the left eye and an end of the left eyebrow upon the face, and generating a first auxiliary line through connecting the end of the left eye with the end of the left eyebrow;
      obtaining an upper eyelid profile of the left eye for being a second auxiliary line, wherein one end of the second auxiliary line is connected with the first auxiliary line;
      moving the second auxiliary line upward for generating a third auxiliary line, wherein one end of the third auxiliary line is connected with the first auxiliary line and another end of the third auxiliary line is connected with the second auxiliary line; and
      constituting the position of the left eye shadow based on the first auxiliary line, the second auxiliary line, and the third auxiliary line;
   wherein, the display module is arranged to display the comparison result.

10. The body information analysis apparatus in claim 9, wherein the processor is configured to control the determining module to execute following activities:
   obtaining an end of the right eye and an end of the right eyebrow upon the face, and generating a fourth auxiliary line through connecting the end of the right eye with the end of the right eyebrow;
   obtaining an upper eyelid profile of the right eye for being a fifth auxiliary line, wherein one end of the fifth auxiliary line is connected with the fourth auxiliary line;
   moving the fifth auxiliary line upward for generating a sixth auxiliary line, wherein one end of the sixth auxiliary line is connected with the fourth auxiliary line and another end of the sixth auxiliary line is connected with the fifth auxiliary line; and
   constituting the position of the right eye shadow based on the fourth auxiliary line, the fifth auxiliary line, and the sixth auxiliary line.

11. The body information analysis apparatus in claim 9, wherein the processor is configured to control the analyzing module to analyze standard deviations (SDs) of the left eye shadow and the right eye shadow respectively, and compare the standard deviations with default standard deviations, or compare one of the standard deviations of the left eye shadow with another one of the standard deviations of the right eye shadow, for generating a second comparison result;

wherein, the processor is configured to control the display module to display the second comparison result.

12. The body information analysis apparatus in claim 9, wherein the positioning module is configured to perform the positioning actions to each facial feature of the face through a Dlib Face Landmark system.

* * * * *